Nov. 30, 1943.   R. STEVENSON   2,335,814
CHECK VALVE
Filed May 8, 1943
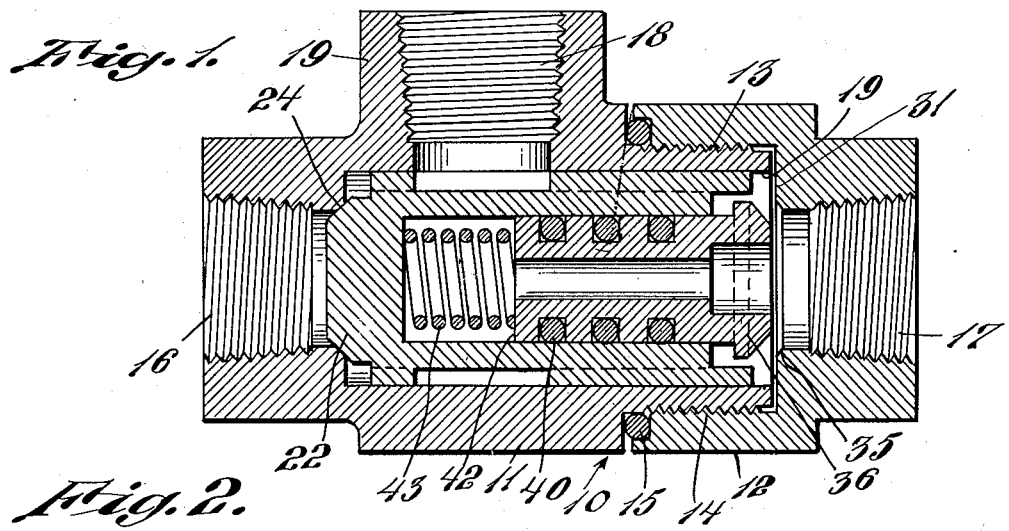
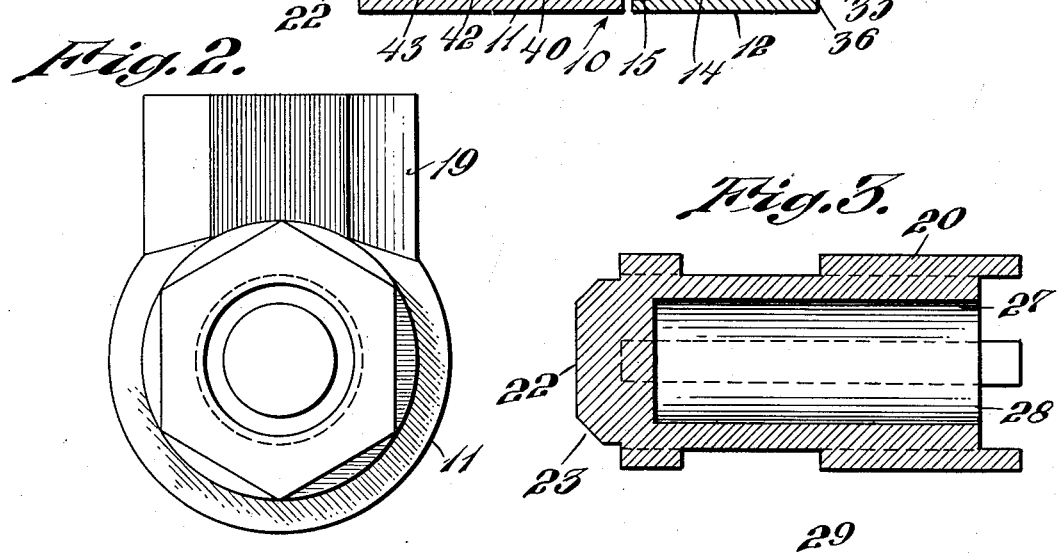
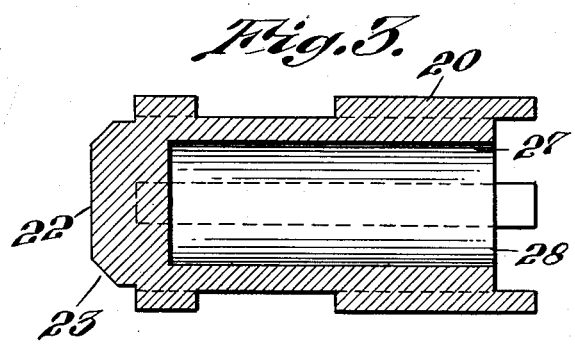
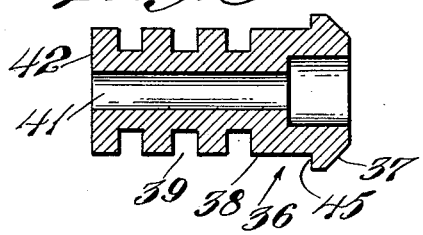
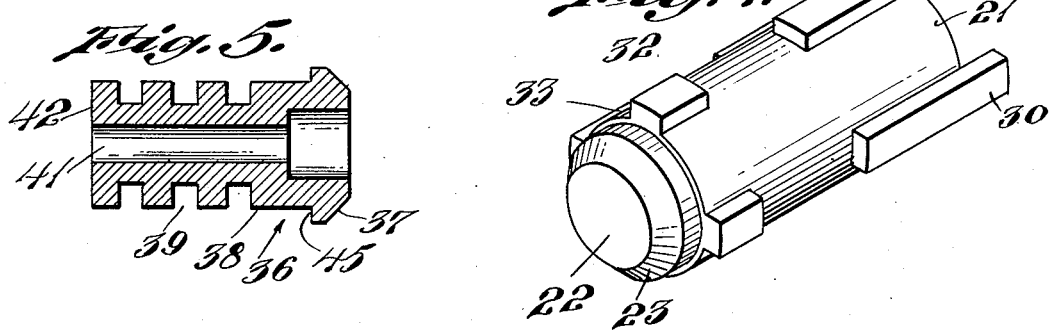
INVENTOR
Robert Stevenson
BY Barlow & Barlow
ATTORNEYS Patented Nov. 30, 1943

2,335,814

UNITED STATES PATENT OFFICE 2,335,814

CHECK VALVE

Robert Stevenson, Barrington, R. I., assignor to Merit Engineering Inc., a corporation of Rhode Island Application May 8, 1943, Serial No. 486,188

4 Claims. (Cl. 277—20)

This invention relates to a check valve such as may be used to control the storing of fluid at a certain predetermined pressure in a reservoir or the like for the operation of some work unit.

Check valves are usually so constructed that the closure member is subjected to the entire pressure which is to be maintained by it. This pressure may and frequently is of such substantial extent that the plunger member must be of relatively hard material in order to prevent its seating face from becoming dented under the forces which act upon it. Similarly the forces may cause grooving or indenting of the valve seat which similarly will effect the tight seating of the closure member.

One of the objects of this invention is to provide a valve which will be so arranged that a light spring may be utilized for controlling the plunger and accordingly no heavy pressure will be exerted upon the plunger and the plunger may be made of relatively soft material.

Another object of this invention is to so construct the valve that the operating plunger may be formed of a plastic rather than a member having some hard surface.

Another object of the invention is to so construct the valve that its relative diameters on either side of its seating surface may be so arranged that the required differential between the two may be had for the control of the valve.

Another object of the invention is to provide a construction of valve which will readily enable the use of an auxiliary supply of fluid in case of failure of the usual or main supply.

With these and other objects in view, the invention consists of certain novel features of construction, as will be more fully described and particularly pointed out in the appended claims.

In the accompanying drawing:

Fig. 1 is a central sectional view through the valve;

Fig. 2 is an end view;

Fig. 3 is a central sectional view through a guide sleeve in the valve and Fig. 4 is a perspective view of this valve sleeve;

Fig. 5 is a central sectional view of the plunger which is guided in the sleeve.

In proceeding with this invention, I have provided a body having axially aligned inlet openings with a laterally extending outlet opening and have provided valve seats adjacent these inlet openings for closure of passage between the inlet and outlet openings.

A guiding sleeve is inserted in the body which has a closed end with a bore to guide the plunger in the body, channels are provided extending from the valve seat to the outlet opening for the conduction of fluid from the inlet to the outlet opening when the valve or plunger member is open. The sleeve may itself move to open the second inlet opening for an auxiliary supply of liquid in case of failure of the main supply.

With reference to the drawing 10 designates generally a body formed in two parts 11 and 12 which are held together by threads 13 on the part 11 and threads 14 on the part 12. A suitable soft packing 15 is provided between these two parts to form a tight seal between them. The inlet openings 16 and 17 are at the ends of the body and in axial alignment. An outlet opening 18 extends through the boss 19 laterally from the body part 11. The body part 11 is provided with a bore 19 of a size to receive a sleeve designated generally 20 and illustrated in perspective in Fig. 4.

This sleeve is of generally cylindrical formation having a cylindrical wall 21 and an end wall 22 which is shaped to provide a tapered valve 23 to engage the valve seat 24 about the inlet opening 16 to serve as a closure therefore. The sleeve is provided with a central bore 27 closed by the wall 21 at one end and open as at 28 at its other end. Ribs 29 extend along the wall 21 and beyond one end of the cylindrical formation as at 30 short of but in a position to engage the shoulder 31 on the part 12 of the body and thus slidably mount the sleeve 20 in the body for a short axial movement. The ribs are interrupted in their extent as at 32 opposite the outlet opening 18 so that liquid flowing along the channels 33 between the ribs may reach the outlet.

A valve seat 35 is located about the inlet opening 17 which it will be noted is located between the inlet and outlet ports so as to control the passage of fluid which enters the inlet opening 17 preventing it from passing to the outlet opening 18 when a plunger 36 (see Figs. 1 and 5) is seated on the valve seat 35. The plunger has a head with a tapered surface 37 which engages the tapered valve seat 35 and is of a diameter 38 back of the head to slidably fit the bore 27 and be guided thereby. Annular grooves 39 in the plunger receive packing material 40 so as to prevent the passage of fluid which is to be controlled between the bore surface 27 and the surface 38 of the plunger. The plunger is provided with an axial opening 41 so that the fluid which enters the inlet opening 17 may pass through the plunger and press upon the opposite end 42 thereby acting on both ends of the plunger for the control of its movement. A spring 43 acts between the end wall 22 of the sleeve and the end wall 42 of the plunger so as to assist the fluid pressure which acts upon the surface 42 in moving the plunger toward closed position.

It will be apparent that fluid which enters the fluid opening 17 will pass through the plunger 36 and the pressure and the direction thereof which is exerted on the plunger will vary with the differential of the diameters on the opposite side of the head of the plunger. The pressure on the diameter of the valve seat 35 will tend to open the plunger while the pressure on the reduced portion 36 will tend to close the plunger. To this latter there is added the pressure of spring 43 plus whatever pressure is exerted upon the area 45 by the pressure of the fluid which is held by the check valve. The values of the diameters chosen are such that when the desired pressure at the outlet exists the area 45 will be so related to the other effective forces pressing on the plunger that the same will move to closed position, and when this drops below the pressure desired the plunger member will open to admit fluid at a higher pressure until the value thereof desired at the outlet side is reached.

This differential or balance may be so nicely maintained by selecting the proper diameters that the valve of the plunger will press upon the valve seat with very little pressure so that the same may be formed of some plastic or relatively soft metal or other similar material thereby providing a plunger which will not be dented nor will the valve seat be so dented as to detrimentally affect a tight closing.

The pressure upon the end wall 22 will hold the valve 23 on its seat 24 and the sleeve normally in the position illustrated in Fig. 1. In case, however, there is a failure of the supply of fluid through the opening 17, I have provided the auxiliary inlet opening 16 through which fluid may be supplied. It is merely necessary to apply pressure to the fluid entering as at 16 sufficient to overcome the pressure of the spring 43 when no fluid pressure exists through the inlet opening 17 which supply of fluid pressure will then move the sleeve 20 axially until the ribs 29 engage the shoulder 31, thus opening the valve from its seat 24 and permitting fluid to flow inwardly through the inlet opening 16 along the channels 33 between the ribs 29, which channels connect through the interruption of the ribs at 32, and then outwardly through the outlet opening 18. This auxiliary supply may thus take place without any change in the line.

I claim:

1. In a check valve, a body provided with inlet and outlet openings, a valve seat between said openings, a sleeve in said body having a central bore, said sleeve having channels separate from said bore connecting said outlet opening with said valve seat, a plunger movable in said bore and engaging said seat and provided with an axial conduit therethrough subjecting its opposite ends to fluid pressure whereby the fluid pressure will press upon the ends of said plunger in accordance with the differential of the diameter of the plunger exposed to said pressure, the diameter of the plunger at the end pressed upon tending to move the plunger toward the valve seat being less than the diameter of the opposite end of the plunger pressed upon, and a spring acting on the plunger additionally urging the plunger toward the valve seat and exerting sufficient force to maintain the plunger in closed condition until the pressure to be held drops below a predetermined amount to cause the pressure differential to overcome the added spring pressure and the plunger to move from the seat to admit fluid under greater pressure.

2. In a check valve, a body provided with inlet and outlet openings, a valve seat between said openings, a sleeve in said body having a central bore closed at one end and open at its other end, said sleeve having channels separate from said bore connecting said outlet opening with said valve seat, a plunger movable in said bore and engaging said seat and provided with an axial conduit therethrough subjecting its opposite ends to fluid pressure whereby the fluid pressure will press upon the ends of said plunger in accordance with the differential of the diameter of the plunger exposed to said pressure, the diameter of the plunger at the end pressed upon tending to move the plunger toward the valve seat being less than the diameter of the opposite end of the plunger pressed upon, and a spring acting between said closed end of said bore and the plunger additionally urging the plunger toward the valve seat and exerting sufficient force to maintain the plunger in closed condition until the pressure to be held drops below a predetermined amount to cause the pressure differential to overcome the added spring pressure and the plunger to move from the seat to admit fluid under greater pressure.

3. In a check valve, a body provided with axially arranged inlet openings and a lateral outlet opening between them, valve seats between said inlet and outlet openings, a cylindrical sleeve slidable in said body having a valve to engage one valve seat and close one inlet opening and provided with a central axial bore closed at one end and open at its other end, said sleeve having channels separate from said bore between the wall of said sleeve and said body connecting said outlet opening with the other said valve seat, a plunger movable in said bore and engaging said seat and provided with an axial conduit therethrough subjecting its opposite ends to fluid pressure whereby the fluid pressure will press upon the ends of said plunger in accordance with the differential of the diameter of the plunger exposed to said pressure, the diameter of the plunger at the end pressed upon tending to move the plunger toward the valve seat being less than the diameter of the opposite end of the plunger pressed upon, and a spring acting between said closed end of said bore and the plunger additionally urging the sleeve valve and said plunger toward their valve seats and exerting sufficient force to maintain the plunger in closed condition until the pressure to be held drops below a predetermined amount to cause the pressure differential to overcome the added spring pressure and the plunger to move from the seat to admit fluid under greater pressure, said sleeve being movable to permit entrance of fluid through said body.

4. In a check valve, a body provided with inlet and outlet openings, a valve seat between said openings, a sleeve in said body having a central bore closed at one end and open at its other end, said sleeve having channels separate from said bore connecting said outlet opening with said valve seat, a plunger movable in said bore and engaging said seat and provided with an axial conduit therethrough subjecting its opposite ends to fluid pressure whereby the fluid pressure will press upon the ends of said plunger in accordance with the differential of the diameter of the plunger exposed to said pressure, the diameter of the plunger at the end pressed upon tending to move the plunger toward the valve seat being less than the diameter of the opposite end of the plunger pressed upon, and a spring acting between said closed end of said bore and the plunger additionally urging the plunger toward the valve seat and exerting sufficient force to maintain the plunger in closed condition until the pressure to be held drops below a predetermined amount to cause the pressure differential to overcome the added spring pressure and the plunger to move from the seat to admit fluid under greater pressure, said plunger being of a relatively soft material.

ROBERT STEVENSON.